United States Patent [19]

Bolin et al.

[11] Patent Number: 4,750,928
[45] Date of Patent: Jun. 14, 1988

[54] CONDUIT FOR MOLTEN GLASS

[75] Inventors: James A. Bolin, Tulsa; Roger P. Weilacher, Sapulpa, both of Okla.

[73] Assignee: Glass Technology Development Corporation, Sapulpa, Okla.

[21] Appl. No.: 66,774

[22] Filed: Jun. 25, 1987

[51] Int. Cl.⁴ .............................................. C03B 5/235
[52] U.S. Cl. ....................................... 65/346; 65/337; 65/356
[58] Field of Search ........................... 65/337, 346, 356

[56] References Cited

U.S. PATENT DOCUMENTS

| | | | |
|---|---|---|---|
| 1,900,361 | 3/1933 | Muholland et al. | 65/346 |
| 2,616,380 | 11/1952 | Griffin | 65/346 X |
| 2,767,518 | 10/1956 | Schmid | 65/346 |
| 3,183,865 | 5/1965 | Ross | 65/346 X |
| 4,294,603 | 10/1981 | Winzer et al. | 65/346 |
| 4,552,579 | 11/1985 | Blumenfeld et al. | 65/346 |
| 4,655,812 | 4/1987 | Blumenfeld | 65/346 |

Primary Examiner—Robert L. Lindsay
Attorney, Agent, or Firm—Senniger, Powers, Leavitt and Roedel

[57] ABSTRACT

An alcove for conducting molten glass to a plurality of forehearths for delivery to glassware forming equipment, comprising a series of zones with a trough extending through the zones and a barrel vault roof over the trough in each zone, the vault bearing on blocks at the top of the sides of the trough carrying burners, the vault having keystones formed to provide side channels over side portions of the stream of molten glass in the trough and a central channel over the central portion of the stream.

14 Claims, 4 Drawing Sheets

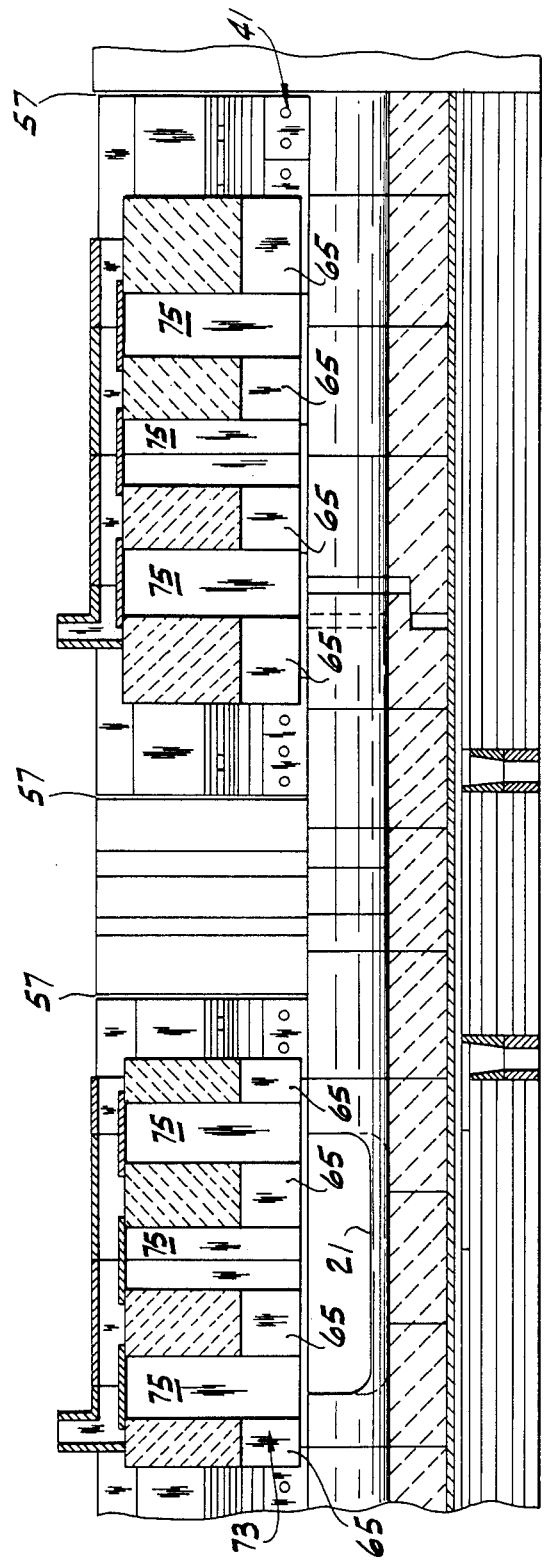

CONDUIT FOR MOLTEN GLASS

BACKGROUND OF THE INVENTION

This invention relates to a conduit for molten glass, and more particularly to a conduit for conducting molten glass from a glass melting furnace for delivery to glassware forming equipment.

The invention is especially concerned with a conduit such as described and more particularly to conduit structure embodied in what is referred to as an "alcove" for delivery of molten glass from a glass melting furnace to a number of forehearths each of which delivers the molten glass to a spout where it is formed into gobs which are subsequently formed into the desired glassware articles. Reference may be made to U.S. Pat. Nos. 3,999,972, 4,494,974 and 4,552,579 for disclosures of such forehearths. While the invention has been developed for an alcove, i.e. an elongate conduit structure for flow of molten glass to a number of forehearths branching off therefrom for delivery of the molten glass to a plurality of glassware forming stations, it is to be understood that the principles of the invention are also applicable to a forehearth, and the term "conduit" is used in a broad sense encompassing conduit useful in forehearths as well as in alcoves.

SUMMARY OF THE INVENTION

The invention involves a construction similar in certain respects to that shown for a forehearth in the aforesaid U.S. Pat. No. 4,552,579 in comprising a trough for flow by gravity of a stream of molten glass and a roof for the trough having spaced projections extending longitudinally of the conduit and extending downwardly from the roof defining a central channel over the central zone of the stream of molten glass and side channels over zones at the sides of the stream, with an improvement in the construction making the roof stronger and less prone to sag or cave in, while being relatively economical to build; and the provision of such a construction particularly suitable for an alcove which, carrying a stream for supplying a plurality of forehearths, is wider than the typical forehearth.

In general a conduit of this invention comprises a trough of refractory material for flow therein of a stream of molten glass, the trough being of relatively wide shallow U-shape and thereby having a bottom and upwardly directed sides, a plurality of blocks on top of the sides of the trough, means carried by the blocks for heating side portions of the stream of molten glass, and an arched roof of refractory material spanning the trough. The roof comprises a plurality of springers on the blocks at the top of the sides of the trough, and a plurality of voussoirs and keystone means constructed to extend in an arch between the springers. The keystone means extends longitudinally with respect to the conduit at the center of the arch. The keystone means has a portion extending downwardly from the intrados of the arch with its lower end at a level below the level of the top of the blocks and above the level of the stream of molten glass, said downwardly extending portion of the keystone means having a passage extending therethrough in the direction of length of the conduit and open at the lower end of the keystone means. The downwardly extending portion of the keystone means in conjunction with the haunches of the arch and the blocks define a pair of side channels extending over side portions of the stream of molten glass and a central channel extending over the central portion of the stream of molten glass. The keystone means is also formed to provide at least one opening extending up from the central channel to the extrados of the arched roof, and the roof has means for covering said opening.

Other objects and features will be in part apparent and in part pointed out hereinafter.

BRIEF DESCRIPTION OF THE DRAWINGS

FIG. 4 is a vertical longitudinal section generally on line 4—4 of FIG. 1

Corresponding reference characters indicate corresponding parts throughout the several views of the drawings.

DETAILED DESCRIPTION

Figure 1:
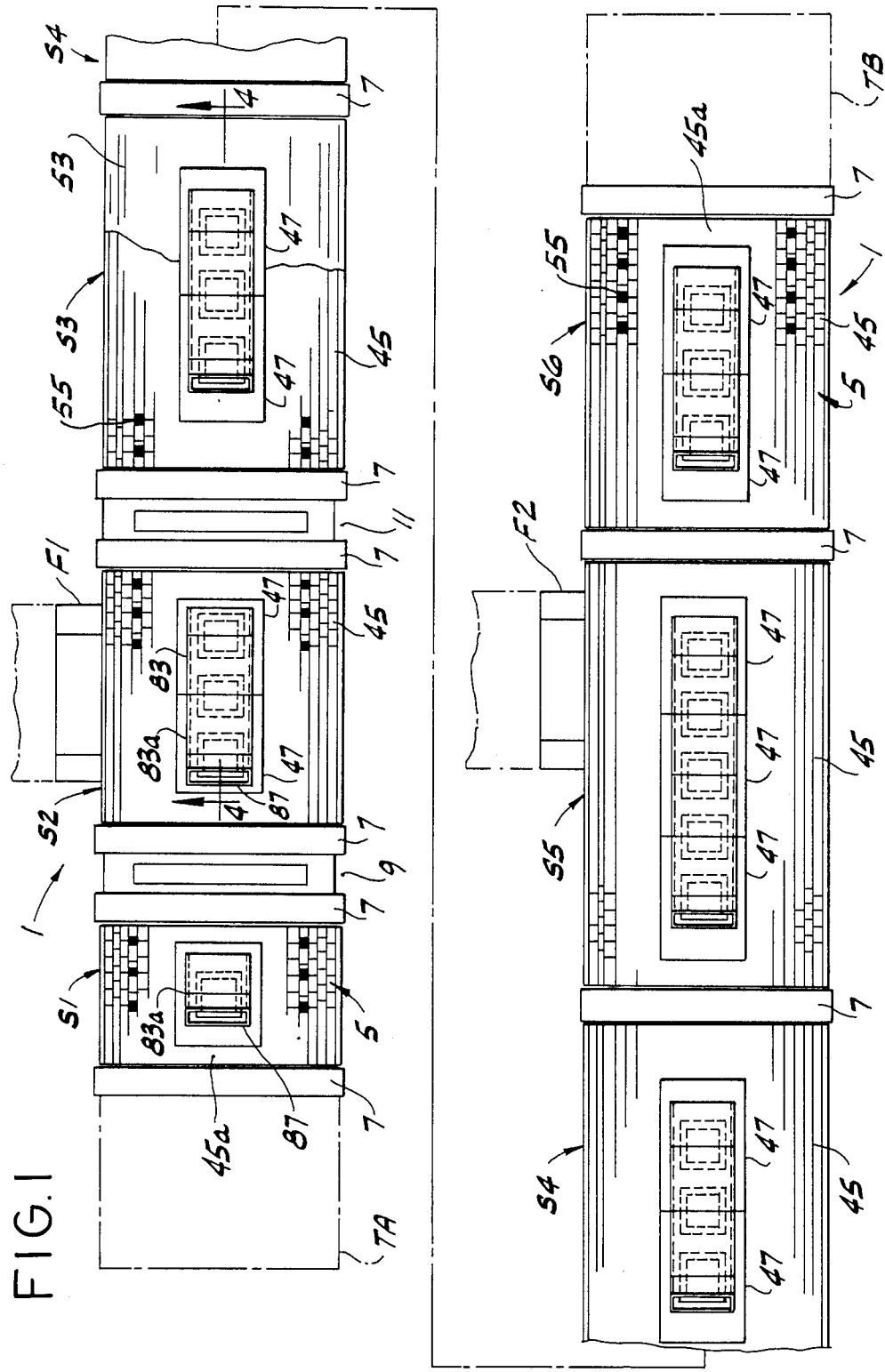
FIG. 1 is a plan of an alcove constructed in accordance with this invention.

Referring to the drawings, there is generally indicated at 1 an alcove embodying this invention, the alcove being constructed for conducting a stream of molten glass from a glass melting furnace or tank indicated at TA at one end of the alcove to one or both of two forehearths indicated generally at F1 and F2, or from a glass melting furnace or tank indicated at TB at the other end of the alcove to one or both of the forehearths. Each of the latter may be of the type shown in U.S. Pat. No. 4,552,579, for example, supplying molten glass to a feeder bowl from which the molten glass is fed in mold charges or gobs into a glassware forming machine, e.g. a bottle forming machine. As appears in FIG. 1, the alcove is in effect divided into a plurality of individual zones or sections enabling individual control over temperature conditions in said zones or sections. Six such zones or sections are shown, designated S1–S6 from the tank TA location (at the left) to the tank TB location (at the right). They are arranged end-to-end in a straight line, the separation of FIG. 1 being for the purpose of showing the entire length of the alcove on one sheet of drawings.

The construction of the alcove 1 is similar to that of the forehearth shown in said U.S. Pat. No. 4,552,579 in comprising an elongate trough of refractory material, designated in its entirety by the reference numeral 3, for flow therein of molten glass, with an arched roof 5 for the trough in each of the alcove zones or sections S1–S6. The trough extends continuously through all six sections. Each section has its own individual arched roof or barrel vault extending between so-called baffle blocks each designated 7 which span the trough 3 at the ends of the section and which close the ends of the vault. Baffle blocks 7 are provided at the adjoining ends of sections S1 and S2 with a space or gap 9 between these blocks for insertion of a dam (not shown) into the trough 3 between these sections. Baffle blocks are provided at the adjoining ends of sections S2 and S3 with a space or gap 11 between these blocks for insertion of a dam (not shown) into the trough between these sections. A single block 7 forms the adjoining ends of sections S3 and S4, S4 and S5 and S5 and S6.

Figure 2:
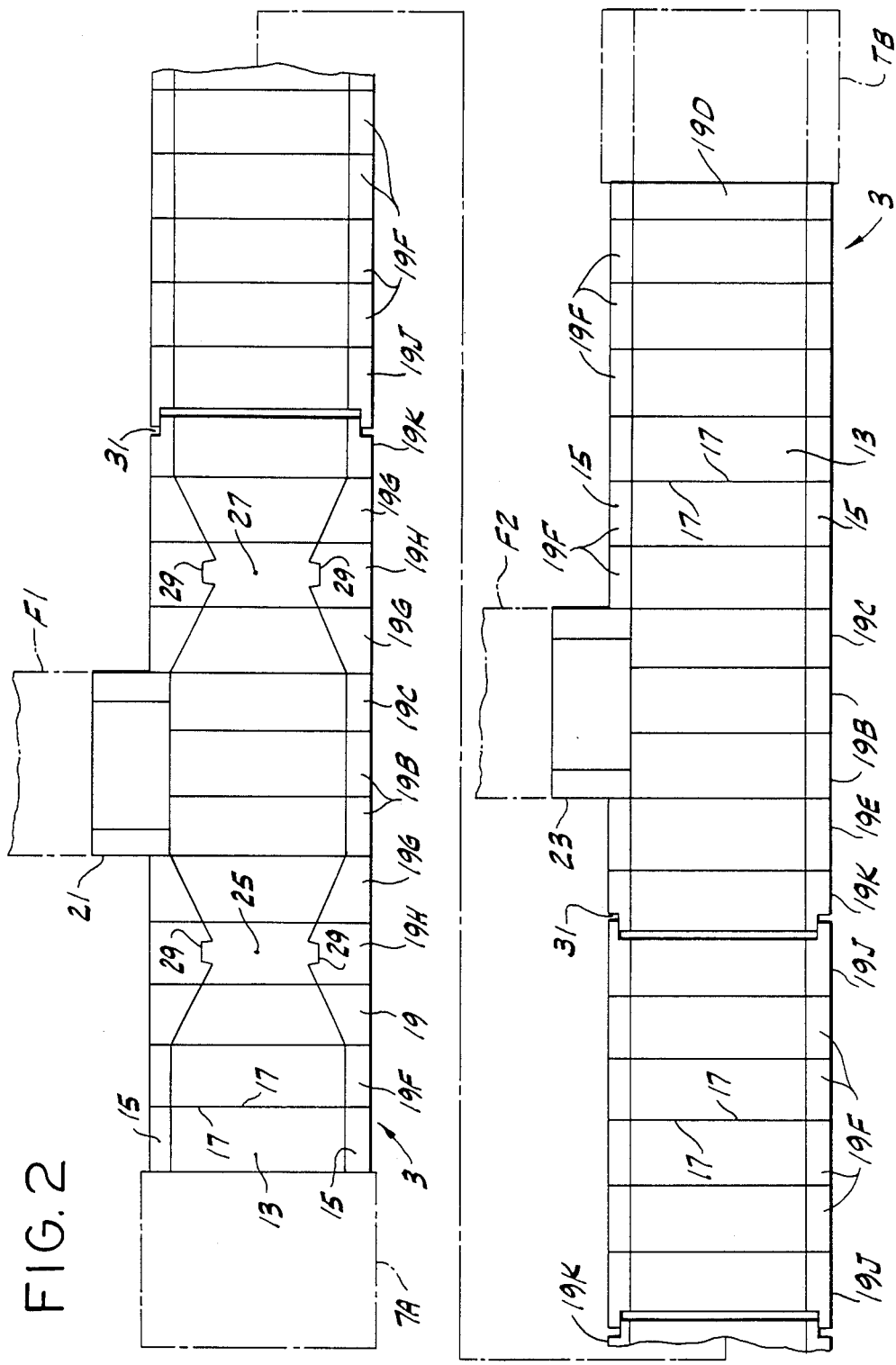
FIG. 2 is a view of FIG. 1 with the roofs of the several sections of the alcove removed, showing in plan the trough of the alcove.

The trough 3 is generally of relatively wide and shallow U-shape, thereby having a bottom 13 and upwardly directed sides 15. As illustrated in FIG. 2, it is constructed of a plurality of individual refractory blocks each generally of the requisite U-shape, these blocks having smooth faces indicated at 17 and being laid in face-to-face abutting relationship in an elongate series to form the trough. The faces 17 are preferably made sufficiently smooth and flat that the blocks may be laid without mortar. The blocks are generally designated by the reference numeral 19, several different types thereof being specially designated 19 B-J being used as appears in FIG. 2. As appears therefrom, the B anc C blocks are specially formed to accommodate lateral outlets 21 and 23 for the forehearths. These outlets are constituted by refractory blocks of relatively wide shallow U-shape (see outlet 21 in FIG. 4). The G and H blocks are specially formed for providing constrictions at 25 and 27 with notches as indicated at 29 for sliding the abovementioned dams into and out of place. The J and K blocks are specially formed for a keyed interfit as indicated at 31 functioning as an expansion joint between the adjacent ends of certain lengths of the trough as appears in FIG. 2. The D, E and F blocks are of the requisite relatively wide and shallow U-shape for forming the trough 3 with the bottom 13 and the sides 15, and without the keying feature of the J and K blocks, differing essentially only in thickness. The trough blocks 19 are bedded as indicated at 33 in FIG. 3 in a suitable bedding material in a supporting base structure as indicated at 35 of suitable thermal insulation material which is suitably supported by a structural steel framework (not shown). The bedding material, e.g. aluminum oxide powder, is adapted in the use of the alcove to stop leakage between the trough blocks. The base structure may be formed with a central tunnel as indicated at 37 for flow of cooling air for bottom cooling of the central portion of the bottom of the trough.

Refractory blocks each identified by the reference numeral 39 are mounted in series on top of each the sides 15 of the trough 3 along its length. These blocks carry means for heating side portions of the stream of molten glass flowing in the trough, this heating means being shown as comprising a series of gas burners 41, each of which may be similar to and mounted similarly to the gas burners shown in the aforesaid U.S. Pat. No. 4,552,579. The flames from these burners play inwardly at the sides of the trough above the level L of the stream of molten glass in the trough.

Figure 3:
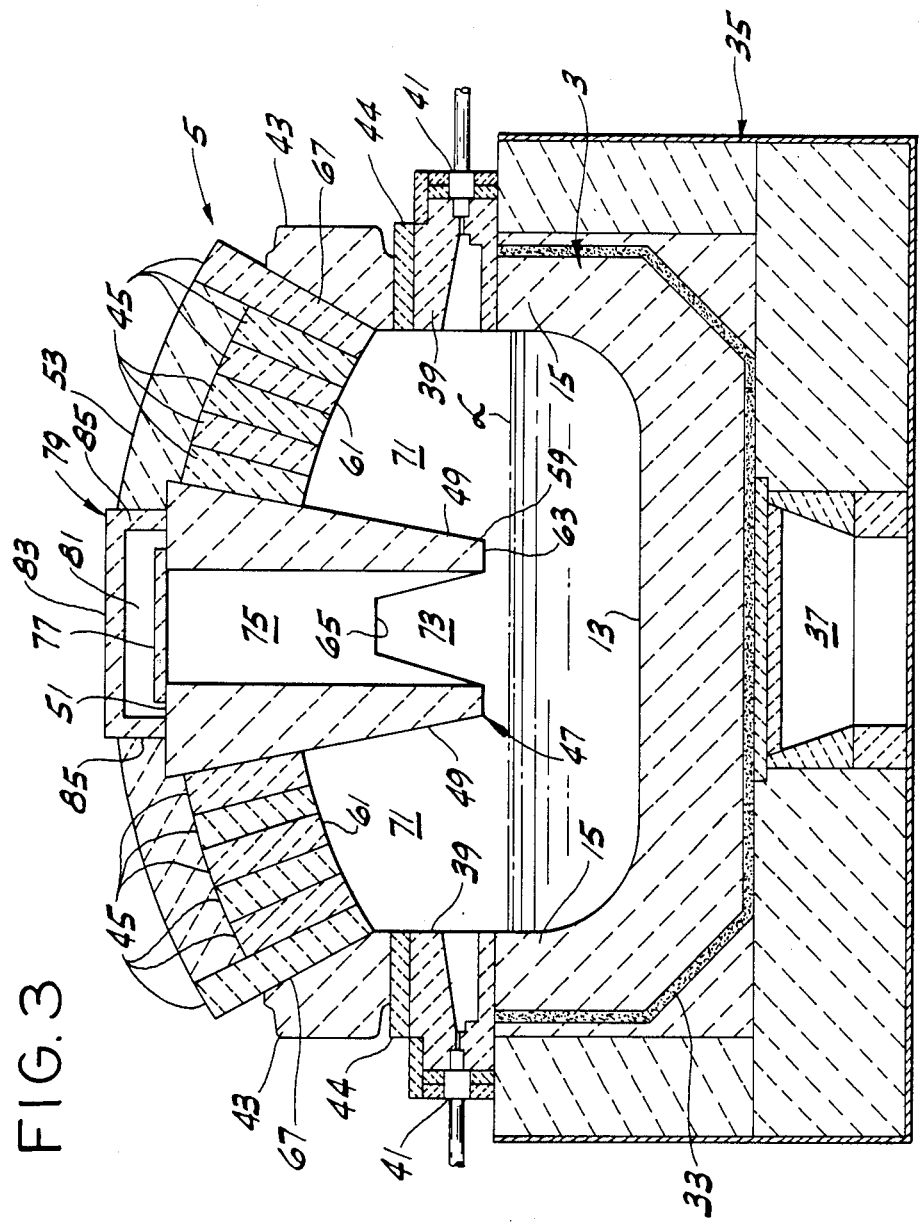
FIG. 3 is a vertical transverse section.

The roofs 5 of the six alcove zones or sections S1-S6 are all generally identical, except for lengthwise dimensions, and a description of one will suffice for all. Each of the roofs differ from the roof of the forehearth of U.S. Pat. No. 4,552,579 in being arched, and more particularly in being constructed as a barrel vault, as distinguished from the flat roof shown in said patent. Thus, the roof 5 of each of sections S1-S6 comprises a series of skew blocks or springers, each designated 43, laid on shims 44 on the burner blocks 39 at the top of the sides 15 of the trough, a plurality of wedge blocks or voussoirs generally designated 45, and keystone means constructed to extend in an arch and more particularly a barrel vault between the springers 43 generally throughout the length of the section between the baffle blocks 7 at the ends of the section. Section S1, which is relatively short, has one keystone 47 as the keystone means. Each of sections S2-S6, which are longer, has a plurality of keystones 47 arranged in an end-to-end series extending longitudinally with respect to the vault as the keystone means. Two such keystones are shown for the roof of each of sections S2, S3, S4 and S6, and three for section S5. As shown in FIG. 3, the keystones have outwardly facing sides 49 which converge toward each other in downward direction, giving the keystone the requisite wedge shape, and a flat upper surface 51. Also as shown in FIG. 3, six courses of voussoirs 45 are provided at each side of the keystones 47, between the springers 43 and the keystones. The keystone in section S1 and the series of keystones in the other sections terminate short of the baffle blocks 7 at the ends of the respective section and the spaces between the ends of the keystone or series of keystones and the baffle blocks at the ends of the section are filled in by additional voussoirs as indicated at 45a in FIG. 1. The voussoirs and the keystones are laid up with refractory mortar, the voussoirs being arranged in a brickwork pattern, and the voussoirs are covered with thermal insulation as indicated at 53 in FIG. 3. Voussoirs are omitted at intervals in the voussoir structure to provide openings therein, removable plugs being provided in these openings as indicated at 55. The ends of each roof or barrel vault 5, as it is constructed, are spaced a short distance from the baffle blocks 7 at the ends thereof as indicated at 57 in FIG. 4, to allow for its thermal expansion.

The keystones 47 in each series of keystones are aligned end to end extending longitudinally with respect to the alcove or conduit. Each keystone has a portion 59 extending downwardly from the intrados 61 of the arch or vault 5 with its lower end 63 at a level generally intermediate the level of the top and bottom of the burner blocks 39 and above the level L of the stream of molten glass in the trough 3. The downwardly extending portion 59 of each keystone has a passage 65 extending therethrough in the direction of the length of the alcove or conduit, this passage being open at the lower end of the keystone. Thus, the downwardly extending portions 59 of the keystone of section S1 and the keystones in eace series of keystones in sections S2-S6 in conjunction with the haunches 67 of the arch or vault 5 and the burner blocks 39 define a pair of side channels each designated 71 extending over side portions of the stream of molten glass, and a central channel 73 extending over the central portion of the stream of molten glass throughout the length of the series of keystones. The keystones 47 are formed to provide openings 75 extending up from the central channel 73 to the flat upper surface 51 of the keystones (i.e. to the extrados of the arch or vault constituting the roof), the roof having means indicated at 77, more particularly relatively thin plates of refractory material which has good thermal conductivity, covering these openings. Certain of the openings may be provided, as shown in FIGS. 1 and 4, by forming the keystones 47 with rectangular notches in abutting ends thereof, the notches forming generally square openings 75 extending from passage 65 up to the top 51 of the keystones when the keystones are assembled end-to-end.

Means indicated generally at 79 is provided extending lengthwise on top of the series of keystones forming a duct 81 for flow of cooling air along the top of the series of keystones over the closure plates 77. This means comprises a series of channel members each generally designated 83 arranged end to end and each placed with its side flanges 85 extending down and bearing on the flat top surface 51 of a keystone 47 on opposite sides of the closure plates 77. One of the channel members, specially designated 83a, at one end of the series of channel members of sections S2-S6 is formed with an upwardly extending end 87 of rectangular tubular formation for connection to cooling air ductwork. Section S1 has a single channel member 83a.

The roof 5 of each of sections S1–S6, being in the form of an arch or barrel vault, is quite strong and capable of standing up under the intense heat to which it is subjected without sagging or caving in, while being of relatively economical construction both from the cost of materials standpoint and the cost of erection. Of special note is the formation of the keystones not only to function as keystones as such but also to form the side channels 71 and the central channel 73 and the heat transferring openings 75 for transferring heat from the central channel through the closure plates 77 to cooling air blown through the duct 81 which extends along the top of the series of keystones of the roof of each of the alcove sections S2–S6, and along the top of the keystone of section S1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A conduit for molten glass comprising:
   a trough of refractory material for flow therein of a stream of molten glass;
   said trough being of relatively wide shallow U-shape and thereby having a bottom and upwardly directed sides;
   a plurality of blocks on top of the sides of the trough;
   means carried by the blocks for heating side portions of the stream of molten glass;
   an arched roof of refractory material spanning the trough;
   said roof comprising a plurality of springers on the blocks at the top of the sides of the trough and a plurality of voussoirs and keystone means constructed to extend in an arch between the springers, the keystone means extending longitudinally with respect to the conduit at the center of the top of the arch;
   the keystone means having a portion extending downwardly from the intrados of the arch with its lower end at a level below the level of the top of the blocks and above the level of the stream of molten glass;
   the downwardly extending portion of the keystone means having a passage extending therethrough in the direction of length of the conduit and open at the lower end of the keystone means;
   the downwardly extending portion of the keystone means in conjunction with the haunches of the arch and the blocks defining a pair of side channels extending over side portions of the stream of molten glass and a central channel extending over the central portion of the stream of molten glass;
   the keystone means also being formed to provide at least one opening extending up from said central channel to the extrados of the arched roof, and the roof having means for covering said opening.

2. A conduit as set forth in claim 1 having means extending lengthwise on top of the keystone means forming a duct for flow of cooling air along the top of the keystone means over the means covering said opening, said covering means being thermally conductive for heat transfer up through the opening and through said covering means to said cooling air flowing in said duct.

3. A conduit as set forth in claim 2 wherein said duct forming means comprises at least one channel member on the keystone means with the side flanges thereof extending down and bearing on the keystone means on opposite sides of said covering means.

4. A conduit as set forth in claim 1 comprising a plurality of zones defined by baffle blocks spanning the trough, each zone having an arched roof as set forth in claim 1 extending between the baffle blocks at the ends of the zone, said trough having lateral outlets each for delivery of molten glass to a forehearth.

5. A conduit as set forth in claim 4 having means for damming the trough between certain of said zones.

6. A conduit as set forth in claim 4 wherein the keystone means of each roof terminates short of the baffle blocks at the ends of the respective zone, wherein the voussoirs are arranged in courses in a brickwork pattern between the springers and the keystone means, and the spaces between the ends of the keystone means and the baffle blocks are filled in with additional voussoirs arranged in a brickwork pattern.

7. A conduit as set forth in claim 4 wherein each roof has means extending lengthwise on top of the keystone means thereof forming a duct for flow of cooling air along the top of the keystone means over the means covering said openings, said covering means being thermally conductive for heat transfer up through the openings and said covering means to said cooling air flowing in said duct.

8. A conduit as set forth in claim 7 wherein each said duct forming means comprises a series of channel members arranged end-to-end on the keystone means with the side flanges thereof extending down and bearing on the keystone means on opposite sides of said covering means.

9. A conduit as set forth in claim 1 wherein the keystone means comprises a single keystone.

10. A conduit as set forth in claim 1 wherein the keystone means comprises a plurality of keystones aligned end-to-end in a series extending lingitudinally with respect to the conduit.

11. A conduit as set forth in claim 10 having means extending lengthwise on top of the series of keystones forming a duct for flow of cooling air along the top of the series over the means covering said openings, said covering means being thermally conductive for heat transfer up through the openings and said covering means to said cooling air flowing in said duct.

12. A conduit as set forth in claim 11 wherein said duct forming means comprises at least one channel member on the keystone means with the side flanges thereof extending down and bearing on the keystone means on opposite sides of said covering means.

13. A conduit as set forth in claim 4 wherein the keystone means in at least one zone comprises a single keystone and the keystone means in each of other zones comprises a plurality of keystones aligned end-to-end in a series extending lingitudinally with respect to the conduit.

14. A conduit as set forth in clain 13 wherein at least two of the keystones in a series thereof have notches in the abutting ends thereof forming said opening.

* * * * *